(12) United States Patent
Yamamoto et al.

(10) Patent No.: US 9,694,695 B2
(45) Date of Patent: Jul. 4, 2017

(54) POWER SOURCE SYSTEM

(71) Applicant: DENSO CORPORATION, Kariya, Aichi-pref. (JP)

(72) Inventors: Toshihisa Yamamoto, Anjo (JP); Hideki Kabune, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/829,450

(22) Filed: Aug. 18, 2015

(65) Prior Publication Data

US 2016/0059715 A1     Mar. 3, 2016

(30) Foreign Application Priority Data

Aug. 29, 2014 (JP) ................. 2014-175663

(51) Int. Cl.
| | |
|---|---|
| *H02P 1/00* | (2006.01) |
| *B60L 11/18* | (2006.01) |
| *H02P 27/06* | (2006.01) |
| *H02P 29/024* | (2016.01) |
| *H02M 1/10* | (2006.01) |
| *H02M 7/48* | (2007.01) |

(52) U.S. Cl.
CPC .......... *B60L 11/1803* (2013.01); *H02P 27/06* (2013.01); *H02P 29/024* (2013.01); *H02M 1/10* (2013.01); *H02M 7/48* (2013.01); *Y02T 10/7005* (2013.01)

(58) Field of Classification Search
CPC ............. B60L 2210/40; B60L 2210/30; B60L 11/1803; B60L 11/1809; B60L 11/1861; B60L 7/14; B60L 11/002; B60L 11/1855

USPC ........... 318/140, 141, 151, 400.3, 722, 434; 180/65.1, 65.21, 65.28, 65.285
See application file for complete search history.

(56) References Cited

U.S. PATENT DOCUMENTS 4,119,861 A * 10/1978 Gocho .................... F01D 19/00
                                                        180/65.265
5,184,109 A *  2/1993 Tanaka .................. H02J 7/1461
                                                        340/438

(Continued)

FOREIGN PATENT DOCUMENTS

JP         H09-233831        9/1997
JP         2002-136076 A    5/2002

*Primary Examiner* — Bentsu Ro
*Assistant Examiner* — Thai Dinh
(74) *Attorney, Agent, or Firm* — Knobbe, Martens, Olson & Bear, LLP

(57) ABSTRACT

A power source system provides: an electrical generator including a rectifying circuit configured by one or more rectifying diodes for allowing electric conduction from a ground side to a battery side; a fuse arranged between the electrical generator and a battery; and a driving apparatus including a circuit configured by one or more semiconductor elements having one or more parasitic diodes for allowing electrical conduction from the ground side to the battery side, and a load. The number of parasitic diodes to be connected in series between a ground and the fuse in the driving apparatus is larger than the number of rectifying diodes to be connected in series between the ground and the battery side in the electrical generator. In addition, the circuit switches electrical conduction in the load.

6 Claims, 3 Drawing Sheets

(56) References Cited

U.S. PATENT DOCUMENTS

| | | | |
|---|---|---|---|
| 8,436,568 B2* | 5/2013 | Mukai | B62D 5/04 |
| | | | 180/443 |
| 2008/0007190 A1* | 1/2008 | Kunii | B60L 11/08 |
| | | | 318/141 |
| 2011/0115287 A1 | 5/2011 | Morita et al. | |
| 2011/0254387 A1 | 10/2011 | Matsuda et al. | |
| 2014/0055887 A1* | 2/2014 | Uryu | H02H 7/1222 |
| | | | 361/18 |

* cited by examiner

POWER SOURCE SYSTEM

CROSS REFERENCE TO RELATED APPLICATIONS

This application is based on Japanese Patent Applications No. 2014-175663 filed on Aug. 29, 2014, the disclosure of which is incorporated herein by reference.

TECHNICAL FIELD

The present disclosure relates to a power source system.

BACKGROUND

It has been known that a power source relay is arranged between a battery and an inverter in an electrical motor driving apparatus. For instance, Japanese Patent Application Publication No. 2014-45578 discloses that a power source relay arranged between a battery and an inverter is configured by a MOSFET.

Japanese Patent Application Publication No. 2014-45578 discloses that the power source relay is added between the battery and the inverter, and a reverse connection protective relay is arranged so that a parasitic diode is in a direction opposite to the power source relay. Therefore, the electrical motor driving apparatus can be protected when the battery is incorrectly connected in a reverse direction.

However, the number of parts is increased with the power source relay and a reverse connection protective relay provided separately.

SUMMARY

It is an object of the present disclosure to provide a power source system that can protect a driving apparatus when a battery is connected in a reverse direction.

According to one aspect of the present disclosure, a power source system provides: an electrical generator that includes a rectifying circuit configured by one or more rectifying diodes for allowing electric conduction from a ground side to a battery side; a fuse that is arranged between the electrical generator and a battery; and a driving apparatus, which is connected to the electrical generator in parallel at a side of the fuse opposite to the battery, that includes: a circuit configured by one or more semiconductor elements having one or more parasitic diodes for allowing electrical conduction from the ground side to the battery side; and a load. Additionally, the number of the parasitic diodes to be connected in series between a ground and the fuse in the driving apparatus is larger than the number of the rectifying diodes to be connected in series between the ground and the battery side in the electrical generator. Moreover, the circuit switches electrical conduction in the load.

Accordingly, the driving apparatus is connected to the electrical generator at the downstream side of the fuse. In addition, the number of parasitic diodes to be connected in series in the driving apparatus is more than the number of rectifying diodes to be connected in series in the electrical generator, therefore, the voltage required for passing a short current through the driving apparatus is larger than the voltage required for passing a short current through the electrical generator. Accordingly, when the battery is connected in a reverse direction, the electrical generator acts as a voltage guard for the driving apparatus and the current flowing through the electrical generator melts down the fuse so that the electrical generator and the driving apparatus are protected. Therefore, the number of components is decreased in comparison to the case where an electronic component (for example, a reverse connection protective relay) for providing protection against the short current in a case of the battery in a reverse connection is separately provided for the driving apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following describes a power source system according to the present disclosure with reference to drawings.

Embodiment 1

Figure 1:
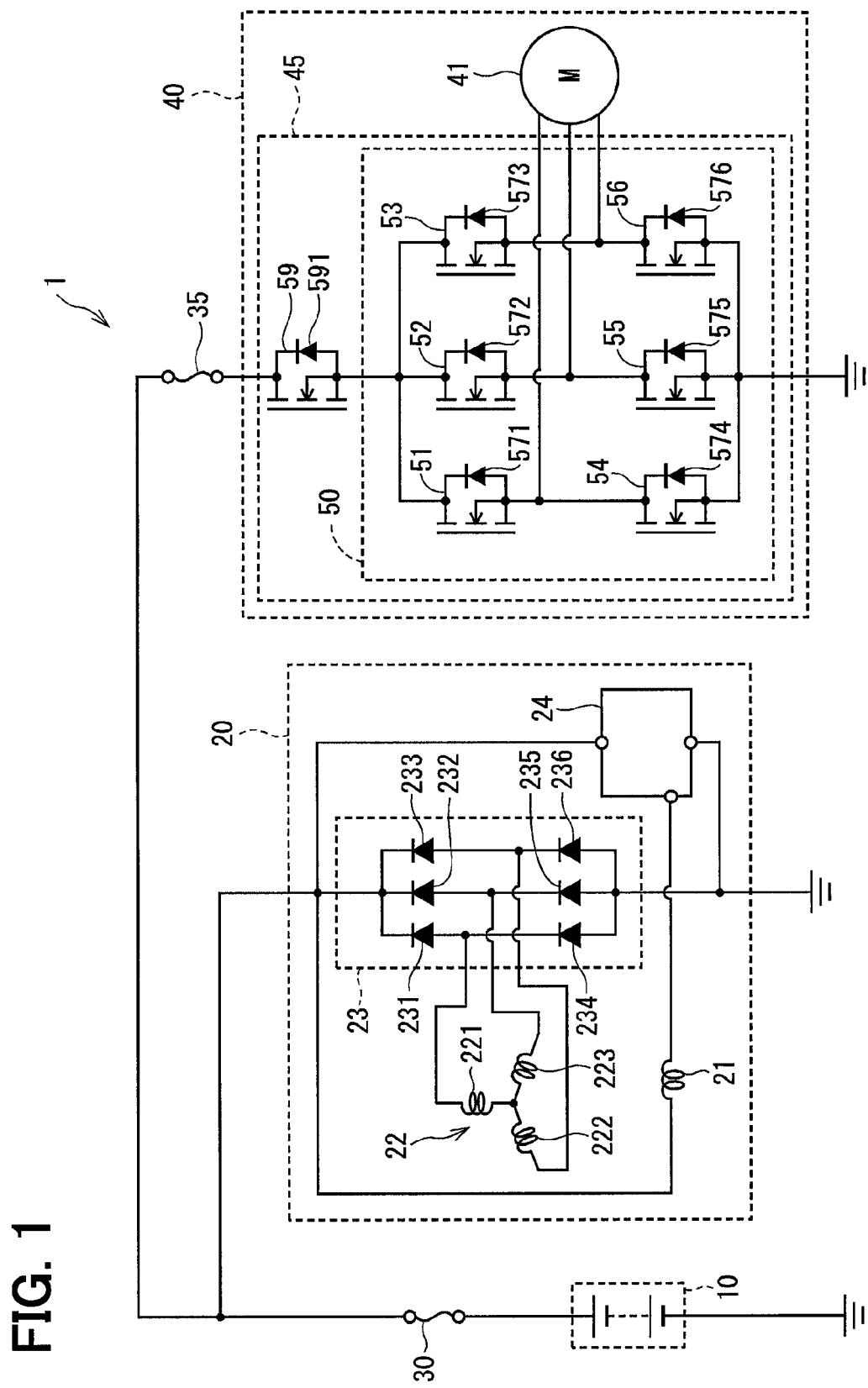
FIG. 1 is a circuit diagram that shows a power source system according to one embodiment of the present disclosure.

As shown in FIG. 1, a power source system 1 according to one embodiment of the present disclosure is a vehicular power source system that includes a battery 10, an alternator 20 as an electrical generator, a first fuse 30, a second fuse 35 and a driving apparatus 40.

The battery 10 is an auxiliary battery that is connected to the alternator 20, the driving apparatus 40, and vehicular auxiliaries such as a water pump or an oil pump and a power window device.

The alternator 20 is a three-phase alternating current generator to be driven by the driving force of an engine (not shown), and acts as a power source for a stator or the like (not shown) or acts as a charger for charging the battery 10. The alternator 20 includes, for example, a rotor coil 21, a stator coil 22, a rectifying circuit 23 and a regulator 24.

The rotor coil 21 is arranged at a rotor to be rotated by the driving force of the engine, and generates a magnetic flux with the flow of an excitation current. The rotor coil 21 has one end that is connected to the rectifying circuit 23 and another end that is connected to the regulator 24.

The stator coil 22 is configured by one or more coils 221, 222, 223, and an alternating current, which is induced by the excitation current flowing through the rotor coil 21, flows through the stator coil 22. The coils 221, 222, 223 are wired together at one end, and are connected to the rectifying circuit 23 at the other end.

The alternating current outputted from the stator coil 22 is three-phase-full-wave rectified by the rectifying circuit 23 and is converted to a direct current. One or more rectifying diodes 231 to 236 are connected in a bridge manner in the rectifying circuit 23. The rectifying diodes 231 to 233 are arranged at a high-potential side. The cathodes of the rectifying diodes 231 to 233 are connected to the battery 10 through the first fuse 30, and the anodes of the rectifying diodes 231 to 233 are connected to the cathodes of the rectifying diodes 234 to 236 arranged at a low-potential side.

The anodes of the rectifying diodes 234 to 236 arranged at a low-potential side are grounded. The connection points between the rectifying diodes 231 to 233 arranged at a high-potential side and the rectifying diodes 234 to 236 arranged at a low-potential side is connected to the other end of the coils 221 to 223 constituting the stator coil 22.

The regulator 24 is connected to the rotor coil 21, and the regulator 24 adjusts an excitation current flowing through the rotor coil 21 so as to adjust a DC voltage generated by the alternator 20 to be a set voltage.

The first fuse 30 is connected between the battery 10 and the alternator 20, and protects the alternator 20. In the present embodiment, the first fuse 30 corresponds to a "fuse."

The second fuse 35 is connected between a side of the first fuse 30, which is opposite to another side where the battery 10 is located, and the driving apparatus 40, and protects the driving apparatus 40.

The driving apparatus 40 according to the present embodiment is applied to an electric power steering apparatus 60 for assisting a driver's steering operation.

Figure 2:
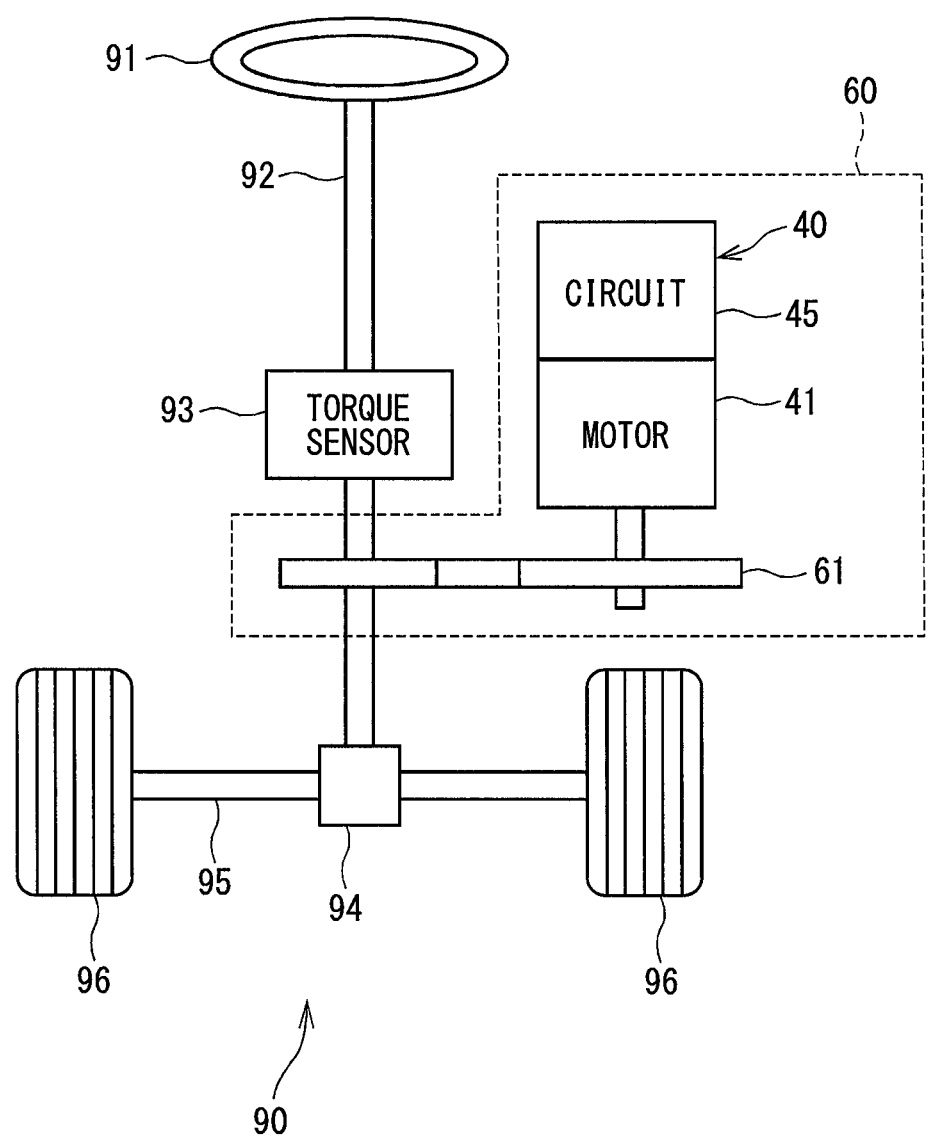
FIG. 2 is a schematic diagram that shows an electric power steering system according to the embodiment of the present disclosure.

Herein, the outline of the electric power steering apparatus 60 is described with reference to FIG. 2. FIG. 2 illustrates the overall configuration of a steering system 90 including the electric power steering apparatus 60. The steering system 90 is configured by, for example, a handle 91 as a steering member, a column shaft 92, a pinion gear 94, a rack shaft 95, a vehicle wheel 96 and the electric power steering apparatus 60.

The handle 91 is connected to the column shaft 92. A torque sensor 93 is provided at the column shaft 92 for detecting a steering torque to be inputted by the handle 91 operated by the driver. The pinion gear 94 is arranged at the tip of the column shaft 92, and the pinion gear 94 is engaged with the rack shaft 95. A pair of vehicle wheels 96 is arranged at both ends of the rack shaft 95 through, for example, a tie rod.

Thus, when the driver rotates the handle 91, the column shaft 92 connected to the handle 91 is rotated. The rotating motion of the column shaft 92 is converted to the linear motion of the rack shaft 95 by the pinion gear 94, and a pair of the vehicle wheels 96 is steered at an angle in response to the displacement of the rack shaft 95.

The electric power steering apparatus 60 includes a speed reduction gear 61 and the driving apparatus 40. The electric power steering apparatus 60 outputs an auxiliary torque for assisting the steering of the handle 91 from a motor 41 based on a signal indicative of, for example, steering torque obtained from the torque sensor 93 or a vehicle speed obtained from a CAN (Controller Area Network) not shown, and transmits the torque to the column shaft 92 through the speed reduction gear 61. That is, the electric power steering apparatus 60 according to the present embodiment may perform the so-called "column assist" for assisting the rotation of the column shaft 92 through the torque generated by the motor 41, or the so-called "rack assist" for assisting the driving of the rack shaft 95. In other words, the column shaft 92 is a "driving object," however, the rack shaft 95 may be configured as a "driving object" in the present embodiment.

The driving apparatus 40 includes, for example, the motor 41 acting as a load and a rotary machine and a circuit 45.

The motor 41 is, for example, a three-phase brushless motor, and the driving of the motor 41 is controlled by the circuit 45. As shown in FIG. 1, the circuit 45 includes, for example, an inverter 50 and a power source relay 59.

The inverter 50 is connected to six driving elements 51 to 56 in a bridge basis, and switches electrical conduction to the motor 41. The driving elements 51 to 56 according to the present embodiment are configured by MOSFETs (Metal Oxide Semiconductor Field Effect Transistors). Each of the driving elements 51 to 56 has a parasitic diode 571 to 576 respectively.

The driving elements 51, 52, 53 are arranged at a high-potential side. The drains of the driving elements 51, 52, 53 are connected to the source of the power source relay 59, and the sources of the driving elements 51, 52, 53 are connected to the drains of the driving elements 54, 55, 56 arranged at a low-potential side. The sources of the driving elements 54, 55, 56 are connected to ground through current detection elements (not shown). The connection point between the driving elements 51, 52, 53 at a high-potential side and the driving elements 54, 55, 56 at a low-potential side is connected to a winding wound on a stator (not shown) in the motor 41.

The power source relay 59 is arranged between the inverter 50 and the second fuse 35, and conducts or blocks current between the battery 10 and the inverter 50. The power source relay 59 includes a parasitic diode 591 configured by a MOSFET similar to the driving elements 51 to 56. The drain of the parasitic diode 591 is connected to the second fuse 35, and the source of the parasitic diode 591 is connected to the inverter 50.

The driving elements 51 to 56 and the power source relay 59 control the operation of ON/OFF through a microcomputer (not shown). In the present embodiment, the driving elements 51 to 56 and the power source relay 59 correspond to "semiconductor elements."

The parasitic diodes 571 to 576 of the driving elements 51 to 56 and the parasitic diode 591 of the power source relay 59 are arranged such that the cathodes are at the battery side and the anodes are at the ground side. The voltage requiring current to flow through the parasitic diodes 571 to 576 in a forward direction is set to be a forward-bias voltage Vf. It is also applied to the rectifying diodes 231 to 236 constituting the rectifying circuit 23 in the alternator 20.

The present embodiment does not provide a reverse connection protective relay to be connected so that the direction of the parasitic diode is opposite to the power source relay 59, therefore, three parasitic diodes (for example, the parasitic diodes 591, 572, 575) are connected in series without passing other elements.

Figure 3:
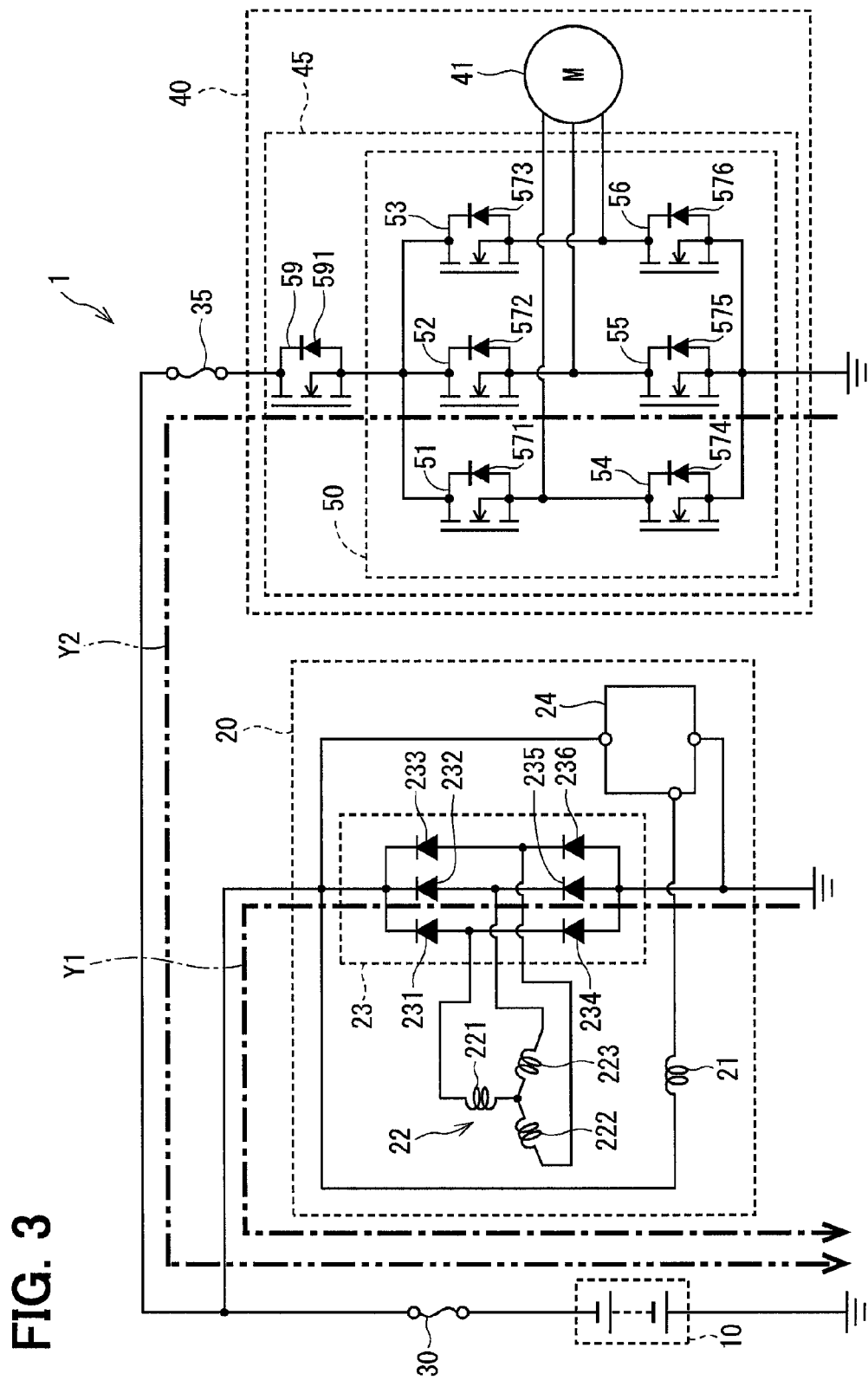
FIG. 3 is a circuit diagram that shows an example in which a battery is reversely connected in the power source system according to the embodiment of the present disclosure.

The following describes an energizing path in which the battery 10 is reversely connected with reference to FIG. 3.

In the driving apparatus 40, the parasitic diode 591 of the power source relay 59, the three parasitic diodes 571 to 573 of the high-potential side driving elements 51 to 53 and the three parasitic diodes 574 to 576 of the low-potential side driving elements 54 to 56 are connected in series. Accordingly, in a case where the driving apparatus 40 is connected to the battery 10 without passing the first fuse 30, three times or larger than the forward-bias voltage Vf (=3Vf) is applied by incorrectly connecting the battery 10 in a reverse direction. Therefore, a short current indicated by an arrow Y2 illustrated by a two-dotted line flows through the parasitic diodes 571 to 576 of the driving elements 51 to 56 and the parasitic diode 591 of the power source relay 59. Thus, it is possible that the driving apparatus 40 malfunctions before the second fuse 35 melts down due to the short current.

On the other hand, in the rectifying circuit 23 of the alternator 20, the rectifying diodes 231 to 233 at the high-potential side and the rectifying diodes 234 to 236 at the low-potential side are respectively connected in series.

Accordingly, when two times the forward-bias voltage Vf (=2Vf) is applied, a current flows in the path indicated by an arrow Y1 illustrated by a one-dotted line.

In the present embodiment, without providing the reverse connection protective relay or the like to be in a direction opposite to the direction of the power source relay 59 and the parasitic diode, the driving apparatus 40 is connected to the battery 10 through the first fuse 30 to avoid damaging the driving apparatus 40 in a case where the battery 10 is connected in a reverse direction. In other words, with regard to the present embodiment, the alternator 20 and the driving apparatus 40 are connected in parallel at the downstream side of the first fuse 30.

In the power source system 1 according to the present embodiment, when the battery 10 is connected in a reverse direction, the current flowing through the path indicated by the arrow Y1 melts down the first fuse 30. Accordingly, even if the battery 10 is connected in a reverse direction, the current through the path indicated by the arrow Y2 does not flow and hence the damage of the driving apparatus 40 is avoided. In other words, as the driving apparatus 40 and the alternator 20 are connected in parallel, the alternator 20 functions as a voltage guard when the battery is in a reverse connection. Hence, the driving apparatus 40 is protected. Therefore, the components such as a reverse connection protective relay in the driving apparatus 40 may be omitted so that the number of components in the driving apparatus 40 is decreased and hence the driving apparatus 40 can be made in a smaller size.

As described above, the power source system 1 includes the alternator 20, the first fuse 30 and the driving apparatus 40.

The alternator 20 includes the rectifying circuit 23 configured by the rectifying diodes 231 to 236 allowing electrical conduction from a ground side to the battery side.

The first fuse 30 is arranged between the alternator 20 and the battery 10.

The driving apparatus 40 includes the circuit 45 and the motor 41. The motor 41 switches the electrical conduction through an electronic circuit. The driving apparatus 40 and the alternator 20 are connected in parallel at the first fuse 30 at a side opposite to the battery 10.

The number of the parasitic diodes 571 to 576, 591 to be connected in series between the ground and the first fuse in the driving apparatus 40 is larger than the number of the rectifying diodes 231 to 236 to be connected in series between the ground and the first fuse 30 in the alternator 20.

In the present embodiment, the driving apparatus 40 is connected to the alternator 20 in parallel at the downstream side of the first fuse 30. Since the number of the parasitic diodes 571 to 576, 591 to be connected in series in the driving apparatus 40 is larger than the number of the rectifying diodes 231 to 236 to be connected in series in the alternator 20, the voltage required for conducting a short current in the driving apparatus 40 is larger than the voltage required for conducting a short current in the alternator 20. Accordingly, in a case where the battery 10 is connected in a reverse direction, the alternator 20 functions as the voltage guard for the driving apparatus 40 and the short current flowing through the alternator 20 melts down the first fuse 30. Hence, the alternator 20 and the driving apparatus 40 are protected. Thus, the number of components is decreased in comparison to the case of separately providing an electronic component such as a reverse connection protective relay for protecting the alternator 20 and the driving apparatus 40 from the short current in a case of the battery being reversely connected.

The semiconductor elements include the driving elements 51 to 56 constituting the inverter 50 to be connected in a bridge basis, and the power source relay 59 arranged at the inverter 50 at the battery side. Therefore, even if the power source relay 59 is configured by a semiconductor element such as a MOSFET, since it is not necessary to separately provide, for example, a reverse connection protective relay or a diode so that the driving apparatus 40 can be made in a smaller size.

The driving apparatus 40 drivers the column shaft 92 through torque outputted from the motor 41 to control the electric power steering apparatus 60 for assisting the driver's steering on the handle 91. Therefore, the electric power steering apparatus 60 may be miniaturized while achieving requirement specification for a whole vehicle system.

Other Embodiments (A) According to the above-mentioned embodiment, the motor is configured by a three-phase brushless motor, and the inverter is configured by a three-phase inverter. Alternatively, the motor may be configured by a motor with a brush, and the inverter may be configured by an H-bridge inverter. The inverter may also be configured by, for example, a three-level inverter. Additionally, one inverter is arranged for the motor. Alternatively, a plurality of inverters may be provided for the motor. As a large number of the inverters are provided, the effect of reducing components such as omitting an electronic component for preventing a reverse connection can be enhanced.

Moreover, a rotary electric machine may be configured by the so-called motor generator that functions as an electrical motor and functions as a power generator. Furthermore, the load may also be configured by an apparatus other than the rotary electric machine.

(B) Two rectifying diodes to be connected in series in the alternator and three parasitic diodes to be connected in series in the driving apparatus are arranged in the above-mentioned embodiment. Alternatively, it is also possible to provide any number larger than the number of parasitic diodes in the driving apparatus to be connected in series and any number lager than the number of rectifying diodes in the alternator to be connected in series.

(C) According to the above-mentioned embodiment, the semiconductor element for constituting the inverter and the power source relay is configured by a MOSFET. Alternatively, one part or all parts of the inverter and the power source relay may be configured by a semiconductor element other than the MOSFET. For example, when an IGBT in which the semiconductor element does not have parasitic diodes is used, reflux diodes arranged separately may be regarded as "parasitic diodes."

(D) According to the above-mentioned embodiment, the rectifying circuit in the alternator is configured by the rectifying diodes. Alternatively, the rectifying circuit may be configured by one or more transistors such as a MOSFETs or an IGBT, and the parasitic diode or the reflux diode may be regarded as the "rectifying diode." In addition, the apparatus other than the alternator may be configured by a power generator.

(E) According to the above-mentioned embodiment, the driving apparatus is applied to the electric power steering apparatus. Alternatively, the driving apparatus may also be applied to the device other than the electric power steering apparatus such as a blower motor or other vehicular auxiliaries including an alternator and a battery.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power source system, comprising:
an electrical generator including a rectifying circuit configured by one or more rectifying diodes for allowing electric conduction from a ground side to a battery side;
a fuse arranged between the electrical generator and a battery; and
a driving apparatus, which is connected to the electrical generator in parallel at a side of the fuse opposite to the battery, including: a circuit configured by one or more semiconductor elements having one or more parasitic diodes for allowing electrical conduction from the ground side to the battery side; and
a load,
wherein the number of the parasitic diodes in the driving apparatus to be connected in series in a forward direction between a ground and the fuse is larger than the number of the rectifying diodes in the electrical generator to be connected in series between the ground and the battery side,
wherein the parasitic diodes are configured to allow a short current flowing through the rectifying diodes to melt down the fuse so as to prevent current flow through the driving apparatus when the battery is connected in reverse, and
wherein the circuit switches electrical conduction in the load.

2. The power source system according to claim 1, wherein the semiconductor element includes one or more driving elements configuring an inverter to be connected in a bridge manner, and a power source relay arranged at the battery side of the inverter.

3. The power source system according to claim 1, wherein the driving apparatus drives a driving object through torque outputted from a rotary electrical machine as the load to control an electrical power steering apparatus for assisting a driver's steering operation of a steering member.

4. The power source system according to claim 1, further comprising:
a second fuse that is arranged between the driving apparatus and one side of the fuse, which is opposite to another side of the fuse where the battery is located.

5. The power source system according to claim 1, wherein a forward bias voltage for conducting the parasitic diodes connected in series in the forward direction is larger than a forward bias voltage for conducting the rectifying diodes connected in series.

6. The power source system according to claim 1, wherein the fuse is configured to melt down when a current flows through the rectifying diodes connected in series.

* * * * *